US010298743B2

(12) United States Patent
Baek et al.

(10) Patent No.: US 10,298,743 B2
(45) Date of Patent: May 21, 2019

(54) MOBILE TERMINAL

(71) Applicant: LG ELECTRONICS INC., Seoul (KR)

(72) Inventors: Songyi Baek, Seoul (KR); Jumin Chi, Seoul (KR); Jihye Ham, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/725,090

(22) Filed: Oct. 4, 2017

(65) Prior Publication Data

US 2018/0338032 A1 Nov. 22, 2018

(30) Foreign Application Priority Data

May 17, 2017 (KR) .................. 10-2017-0060896

(51) Int. Cl.
H04W 4/50 (2018.01)
H04M 1/725 (2006.01)
G06F 21/31 (2013.01)
G06F 21/88 (2013.01)
H04W 48/04 (2009.01)
H04W 88/02 (2009.01)
G06K 9/00 (2006.01)
G10L 17/00 (2013.01)
(Continued)

(52) U.S. Cl.
CPC ...... H04M 1/72577 (2013.01); G06F 21/316 (2013.01); G06F 21/88 (2013.01); G06K 9/00288 (2013.01); G10L 17/005 (2013.01); H04M 1/72572 (2013.01); H04M 3/54 (2013.01); H04W 4/02 (2013.01); H04W 4/50 (2018.02); H04W 8/245 (2013.01); H04W 12/08 (2013.01); H04W 48/04 (2013.01); H04W 52/0209 (2013.01); H04W 88/02 (2013.01); G06F 2221/2111 (2013.01); G06N 99/005 (2013.01)

(58) Field of Classification Search
CPC .................................................. H04M 1/72577
USPC ......................................................... 455/411
See application file for complete search history.

(56) References Cited

U.S. PATENT DOCUMENTS 7,783,281 B1 * 8/2010 Cook ...................... G06F 21/88
455/410
8,864,847 B1 10/2014 Casaburi et al.
(Continued)

OTHER PUBLICATIONS

European Patent Office Application Serial No. 17001281.9, Search Report dated Jan. 12, 2018, 10 pages.
(Continued)

Primary Examiner — Joel Ajayi
(74) Attorney, Agent, or Firm — Lee, Hong, Degerman, Kang & Waimey PC

(57) ABSTRACT

A mobile terminal includes a wireless communication unit configured to perform wireless communication with an artificial intelligence device, an artificial intelligence unit configured to recognize a loss state of the mobile terminal if information included in a signal received from the artificial intelligence device indicates the loss state of the mobile terminal and to generate a control signal for switching an operation mode of the mobile terminal according to the recognized loss state, and a controller configured to set the operation mode of the mobile terminal to a loss mode for restricting use of the mobile terminal according to the generated control signal.

15 Claims, 15 Drawing Sheets

(51) Int. Cl.
  *H04M 3/54*    (2006.01)
  *H04W 4/02*    (2018.01)
  *H04W 8/24*    (2009.01)
  *H04W 12/08*   (2009.01)
  *H04W 52/02*   (2009.01)
  *G06N 99/00*   (2019.01)

(56) References Cited

U.S. PATENT DOCUMENTS

| | | |
|---|---|---|
| 2004/0180673 A1 | 9/2004 | Adams et al. |
| 2011/0047033 A1* | 2/2011 | Mahaffey ............ G06Q 30/0269 |
| | | 705/14.66 |
| 2012/0252411 A1 | 10/2012 | Johnsgard et al. |
| 2014/0057597 A1* | 2/2014 | Velusamy ............. H04W 22/08 |
| | | 455/411 |
| 2015/0207917 A1* | 7/2015 | Yang .................... H04W 12/00 |
| | | 455/411 |
| 2015/0235058 A1 | 8/2015 | Kim |
| 2016/0343235 A1* | 11/2016 | Belvin .................. G08B 21/24 |

OTHER PUBLICATIONS

Hu, Huizhong, "Using a Personalized Machine Learning Approach to Detect Stolen Phones," XP055437013, Dec. 2015, 46 pages.

\* cited by examiner

MOBILE TERMINAL

CROSS-REFERENCE TO RELATED APPLICATIONS

Pursuant to 35 U.S.C. § 119(a), this application claims the benefit of earlier filing date and right of priority to Korean Patent Application No. 10-2017-0060896, filed on May 17, 2017, the contents of which are hereby incorporated by reference herein in its entirety.

BACKGROUND

The present invention relates to a mobile terminal and, more particularly, to a mobile terminal capable of recognizing loss thereof. Artificial intelligence is computer engineering and information technology including methods of enabling a computer to perform thinking, learning, self-improvement, etc. capable of being performed by human intelligence, and enables a computer to imitate the intelligent behavior of human beings.

In addition, artificial intelligence is directly or indirectly associated with other computer science fields. In particular, today, attempts to introduce artificial intelligence elements into various fields of information technology and to solve the problems of the fields have been actively conducted.

Meanwhile, in the related art, context awareness technology for recognizing the situation of a user using artificial intelligence and providing desired information to the user in a desired form has been studied.

As context awareness technology has been developed, demand for a mobile terminal capable of performing a function suitable for the situation of a user has increased.

Recently, artificial intelligence technology has been applied to a mobile terminal.

However, in the related art, if a mobile terminal is lost, a user may only access a server of a communication company to confirm the position of the mobile terminal, but cannot take other actions.

Therefore, if the mobile terminal is lost, it is difficult for the user to find the mobile terminal.

SUMMARY

Accordingly, an object of the present invention is to address the above-noted and other problems.

An object of the present invention is to recognize loss of a mobile terminal to restrict use of the mobile terminal by a finder.

Another object of the present invention is to provide a mobile terminal capable of recognizing the loss state thereof to restrict use of the mobile terminal and to transmit information on the loss state of the mobile terminal to another mobile terminal.

According to an embodiment of the present invention, a mobile terminal includes a wireless communication unit configured to perform wireless communication with an artificial intelligence device, an artificial intelligence unit configured to recognize a loss state of the mobile terminal if information included in a signal received from the artificial intelligence device indicates the loss state of the mobile terminal and to generate a control signal for switching an operation mode of the mobile terminal according to the recognized loss state, and a controller configured to set the operation mode of the mobile terminal to a loss mode for restricting use of the mobile terminal according to the generated control signal.

According to another embodiment, a mobile terminal includes a wireless communication unit configured to perform wireless communication with an artificial intelligence device, an artificial intelligence unit configured to collect context information of the mobile terminal, to recognize a loss state of the mobile terminal based on the collected context information and to generate a control signal for switching an operation mode of the mobile terminal according to the recognized loss state, and a controller configured to set the operation mode of the mobile terminal to a loss mode for restricting use of the mobile terminal according to the generated control signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
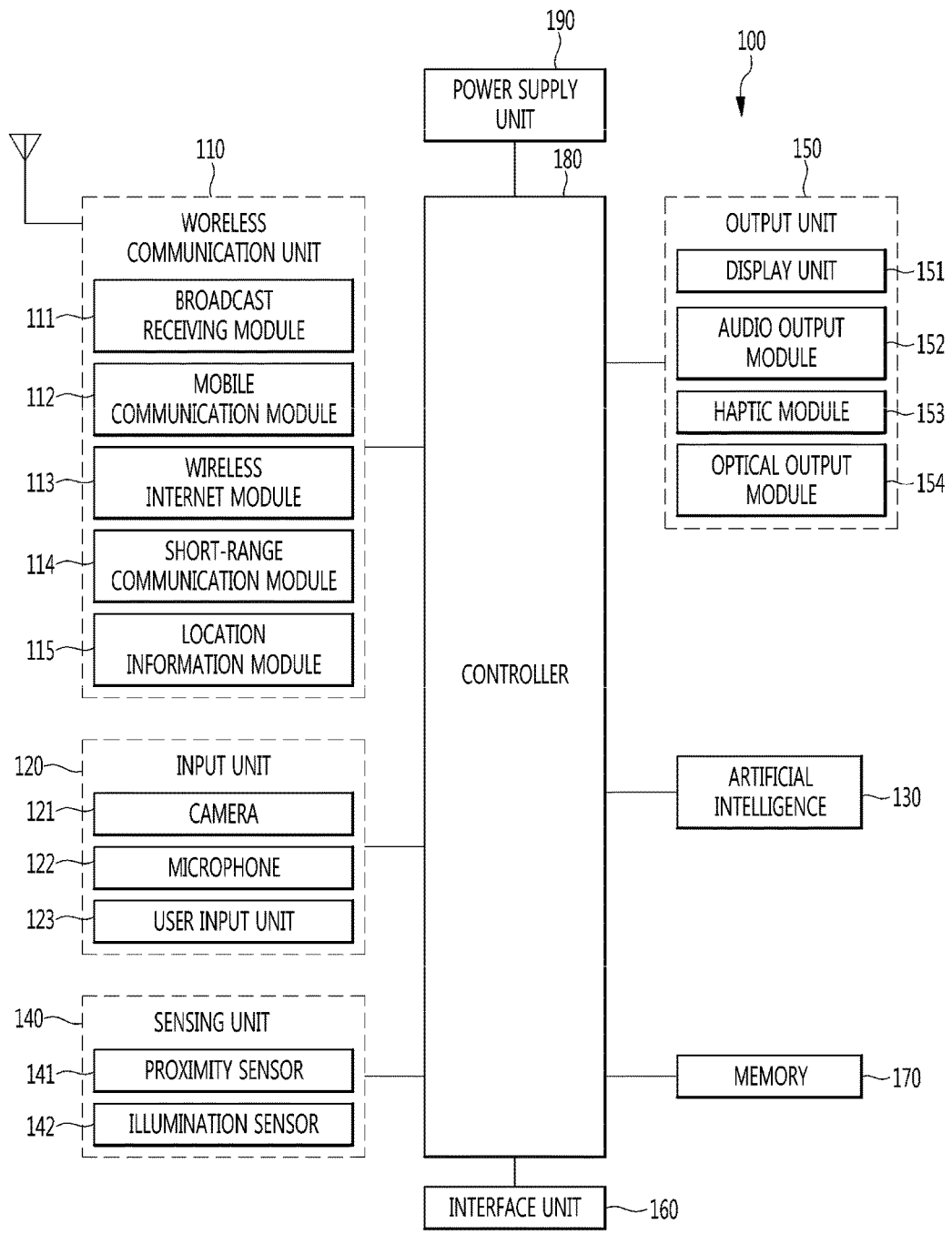
FIG. 1A is a block diagram of a mobile terminal in accordance with the present disclosure.
Figure 1B:
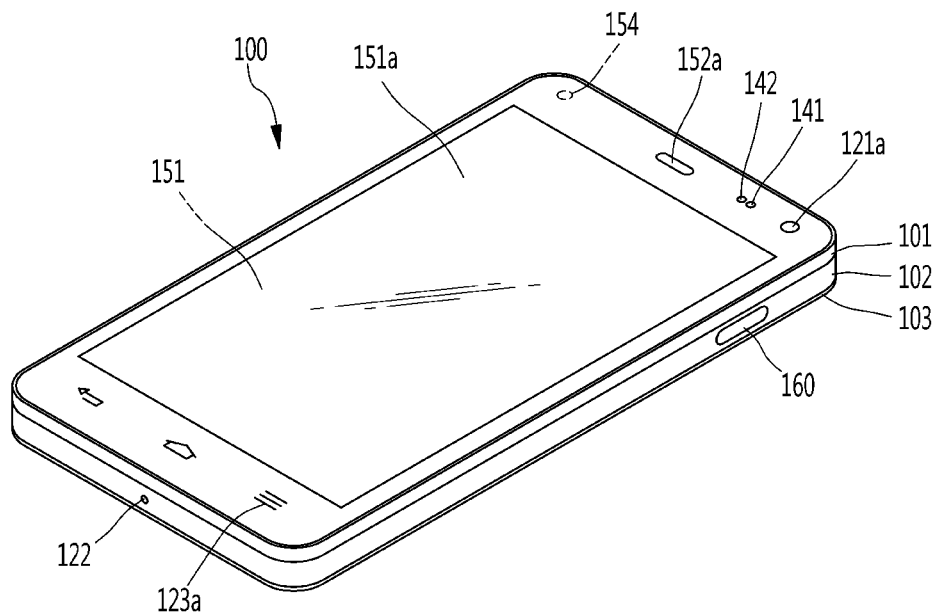
FIGS. 1B and 1C are conceptual views of one example of the mobile terminal, viewed from different directions.
Figure 1C:
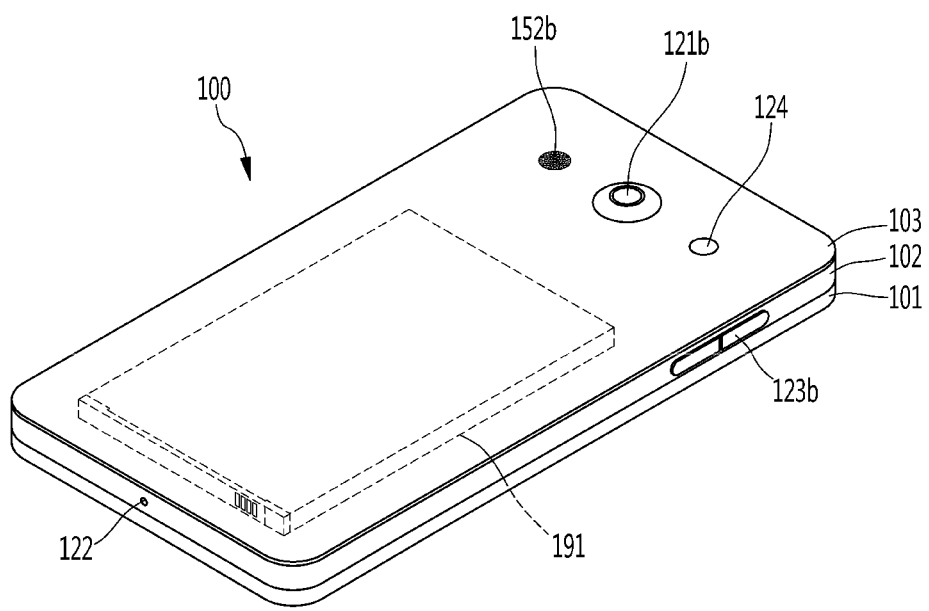

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, an artificial intelligence unit (130), a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The artificial intelligence unit 130 serves to process information based on artificial intelligence technology and may include one or more modules for performing at least one of information learning, information inference, information perception or natural language processing.

The artificial intelligence unit 130 may perform at least one of learning, inference or processing of an enormous amount of information (big data) such as information stored in the mobile terminal, surrounding environmental information of the mobile terminal or information stored in an external storage capable of performing communication using machine learning technology. The artificial intelligence unit 130 may control the mobile terminal to predict (or infer) operation of at least one executable mobile terminal and to perform operation having highest feasibility among one or more predicted operations using information learned using machine learning technology.

Machine learning technology refers to technology for collecting and learning an enormous amount of information based on at least one algorithm and determining and predicting information based on the learned information. Information learning refers to operations for checking features, rules, judgement criteria, etc., of information, quantizing a relation between information and information and predicting new data using the quantized pattern.

An algorithm using such machine learning technology may be based on statistics and may include, for example, a decision tree using a tree structure as a prediction model, a neural network for emulating the neural network structures and functions of living things, genetic programming based on evolutionary algorithms, clustering for dividing observed examples into subsets such as clusters, a Monte Carlo method of stochastically calculating a function value repeated random sampling, etc.

Deep learning technology as machine learning technology refers to technology of performing at least one of information learning, judgement and processing using an artificial neural network. The artificial neural network may have a structure for connecting nodes and delivering data between nodes. Such deep learning technology may learn an enormous amount of information through an artificial neural network using an optimized graphics processing unit (GPU) optimized for parallel arithmetic.

Meanwhile, the artificial intelligence unit 130 may collect (sense, monitor, extract, detect, or receive) signals, data, information, etc. input to or output from components of the mobile terminal, in order to collect an enormous amount of information for applying machine learning technology. In addition, the artificial intelligence unit 130 may collect (sense, monitor, extract, detect or receive) data, information, etc. stored in an external storage (e.g., a cloud server). More specifically, information collection may be understood as including operation for sensing information through a sensor, extracting information stored in the memory 170 or receiving information from the external storage through communication.

The artificial intelligence unit 130 may sense internal information of the mobile terminal, surrounding environmental information of the mobile terminal and user information through the sensing unit 140. In addition, the artificial intelligence unit 130 may receive broadcast signals and/or broadcast related information, wireless signals, wireless data, etc. through the wireless communication unit 110. In addition, the artificial intelligence unit 130 may receive video information (or signal), audio signal (or signal), data or user input information from the input unit.

The artificial intelligence unit 130 may collect an enormous amount of information on the background in real time, learn the information, process the information into an appropriate format (e.g., a knowledge graph, a command policy, a personalization database, a dialog engine, etc.), and store the processed information in the memory 170.

The artificial intelligence unit 130 may predict operation of the mobile terminal based on information learned using machine learning technology, control the components of the mobile terminal in order to perform the predicted operation or deliver a control command for performing the predicted operation to the controller 180. The controller 180 may control the mobile terminal based on the control command to perform the predicted operation.

If specific operation is performed, the artificial intelligence unit 130 may analyze history information indicating the performed specific operation through machine learning technology and update previously learned information based on the analyzed information. The artificial intelligence unit 130 may improve information prediction accuracy.

Meanwhile, in this specification, the artificial intelligence unit 130 and the controller 180 may be understood as the same component. In this case, the function performed by the controller 180 described in this specification may be described as being performed by the artificial intelligence unit 130. The controller 180 may be referred to as the artificial intelligence unit 130 or the artificial intelligence unit 130 may be referred to as the controller 180.

In contrast, in this specification, the artificial intelligence unit 130 and the controller 180 may be understood as different components. In this case, the artificial intelligence unit 130 and the controller 180 may exchange data with each other to perform a variety of control on the mobile terminal. The controller 180 may perform at least one function on the mobile terminal and control at least one of the components of the mobile terminal, based on the result derived from the artificial intelligence unit 130. Further, the artificial intelligence unit 130 may operate under control of the controller 180.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, if the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, if the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, if a call is received in the mobile terminal 100, the user may answer the call using the wearable device. Also, if a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, if the mobile terminal uses a GPS module, a position of the mobile terminal may be acquired using a signal sent from a GPS satellite. As another example, if the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. If the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

If a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

If the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications if a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, if the rear cover 103 is detached from the rear case 102, the electronic components mounted to the rear case 102 are externally exposed.

As illustrated, if the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. If a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. If a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger if the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." If the second camera 121b is implemented as an array camera, images may be captured in various manners using the plurality of lenses and images with better qualities.

As shown in FIG. 1C, a flash 124 is shown adjacent to the second camera 121b. If an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. If the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
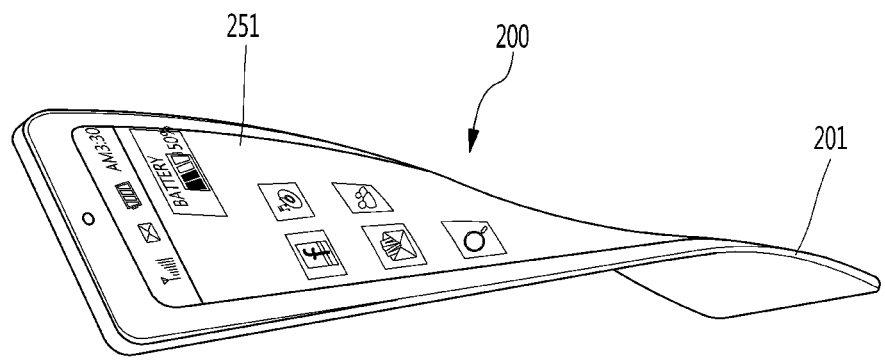
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If in a state that the flexible display unit 251 is not deformed (for example, in a state with an infinite radius of curvature and referred to as a first state), a display region of the flexible display unit 251 includes a generally flat surface. If in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. If a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, if the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, if a call is received in the mobile terminal 100, the user can answer the call using the wearable device. Also, if a message is received in the mobile terminal 100, the user can check the received message using the wearable device.

Figure 3:
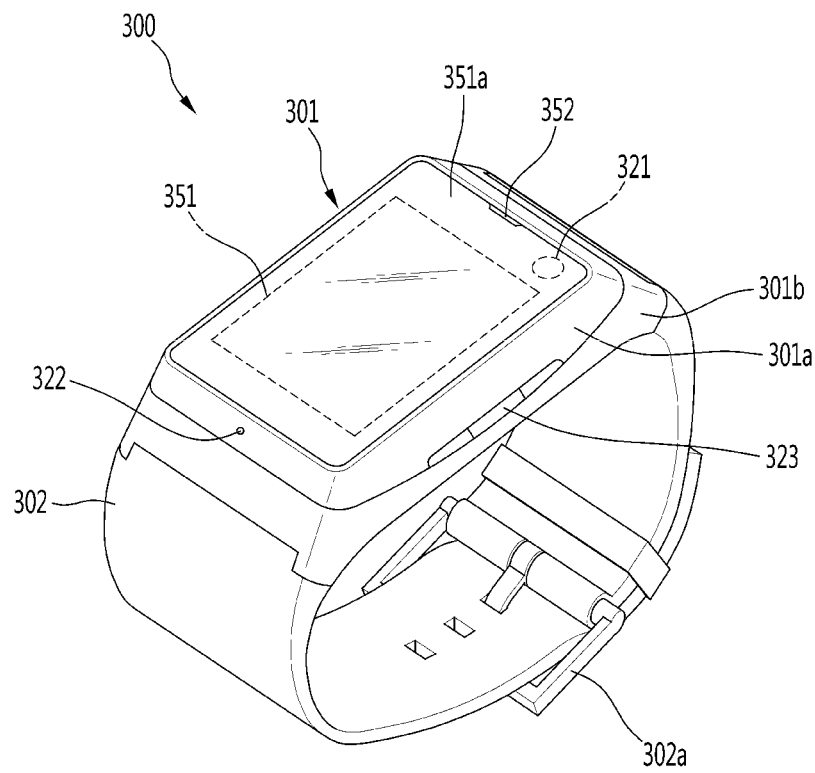
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. If the display unit 351 is implemented as a touch screen, additional function keys may be minimized or eliminated. For example, if the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
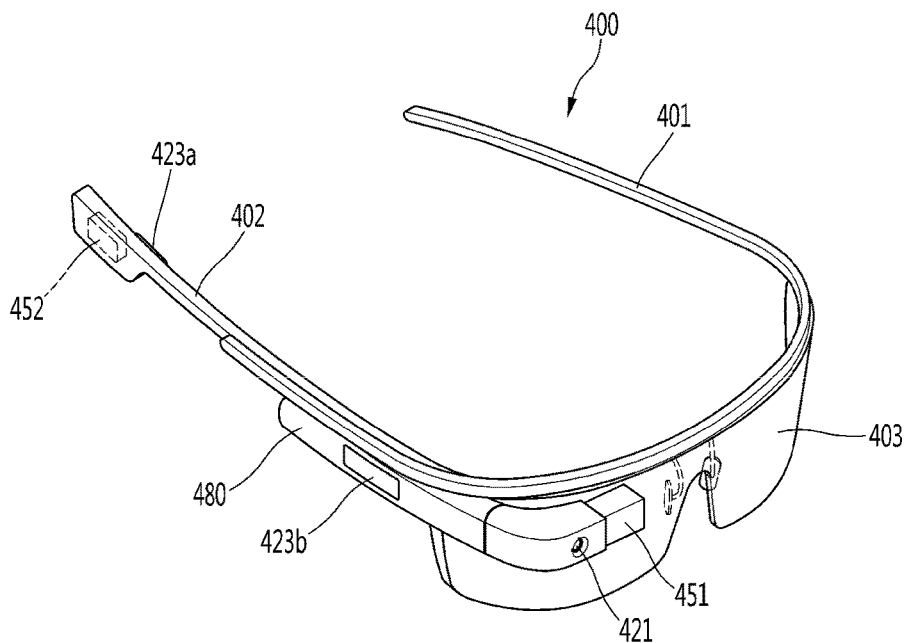
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. If the audio output module 452 is implemented in the osteoconductive manner, the audio output module 452 may be closely adhered to the head if the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations.

The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Hereinafter, a method of operating an artificial intelligence system according to an embodiment of the present invention will be described.

Assume that the artificial intelligence system includes a mobile terminal 100 and an artificial intelligence device 500.

The artificial intelligence device 500 may include all the components of the mobile terminal 100 described with reference to FIGS. 1a to 1c.

Figure 5:
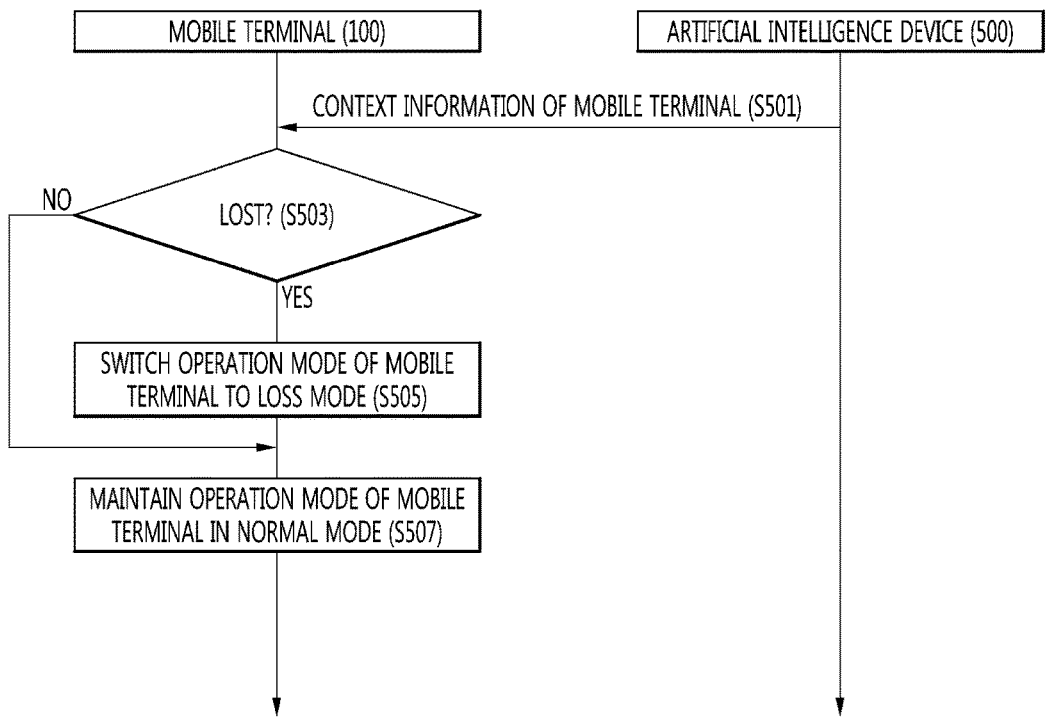
FIG. 5 is a ladder diagram illustrating a method of operating a mobile terminal according to an embodiment of the present invention.

FIG. 5 is a ladder diagram illustrating a method of operating a mobile terminal according to an embodiment of the present invention.

In particular, FIG. 5 shows an embodiment in which the mobile terminal 100 senses that the mobile terminal 100 is lost based on information received from the artificial intelligence device 500 and switches an operation mode of the mobile terminal 100 to a loss mode.

Referring to FIG. 5, the wireless communication unit 110 of the mobile terminal 100 receives context information of the mobile terminal 100 from the artificial intelligence device 500 (S501).

The wireless communication unit 110 may periodically receive signals from the artificial intelligence device 500. The received signals may include the context information of the mobile terminal 100.

In one embodiment, the context information of the mobile terminal 100 may include information indicating the loss state of the mobile terminal 100.

In one embodiment, the artificial intelligence device 500 may receive a voice command of a user and acquire loss information based on the received voice command. For example, if voice "My mobile phone was lost" is received, the artificial intelligence device 500 may acquire the received voice as loss information. The above voice is merely exemplary and voice related to loss of the mobile terminal 100, such as "Please find my mobile phone", may be used.

The artificial intelligence device 500 may determine whether a speaker of the received voice corresponds to the user of the mobile terminal 100 or not. The artificial intelligence device 500 may determine whether the received voice is pre-registered user voice using one or more of the tone and pattern of the received voice.

To this end, the artificial intelligence device 500 may store the tone and pattern of the pre-registered user voice.

The artificial intelligence device 500 may transmit loss information indicating that the mobile terminal 100 has been lost to the mobile terminal 100, if the received voice is the pre-registered user voice.

As another example, if voice "My mobile phone was lost" is received, the artificial intelligence device 500 may transmit the voice to the mobile terminal 100 without an authentication process.

In one embodiment, the context information of the mobile terminal 100 may include a text message received from the artificial intelligence device 500 or another mobile terminal.

The artificial intelligence unit 130 of the mobile terminal 100 determines whether the mobile terminal 100 is lost, based on the received context information of the mobile terminal 100 (S503).

In one embodiment, the artificial intelligence unit 130 may continuously collect the received context information and determine whether the mobile terminal 100 is lost based on the result of collection.

For example, the artificial intelligence unit 130 may recognize that the mobile terminal 100 is lost, if the voice received from the artificial intelligence device 500 is the voice of the user of the mobile terminal 100 and indicates the loss state of the mobile terminal.

As another example, the artificial intelligence unit 130 may sense the loss state of the mobile terminal 100 based on the text message received from another mobile terminal. More specifically, the artificial intelligence unit 130 may recognize the loss state of the mobile terminal 100, if the user of another mobile terminal is pre-registered and the text message indicates that the mobile terminal is lost.

The text message may include information indicating the loss state of the mobile terminal "My mobile phone was lost. Please contact this phone number. 010-XXXX-XXXX".

The artificial intelligence unit 130 may recognize the loss state of the mobile terminal 100, if the text included in the text message indicates that the mobile terminal 100 is currently lost.

Although the text message is described herein, the present invention is not limited thereto and is applicable to a message received through a message application.

The artificial intelligence unit 130 of the mobile terminal 100 switches the operation mode of the mobile terminal 100 to a loss mode, upon determining that the mobile terminal 100 is lost (S505).

The operation mode of the mobile terminal 100 may include a normal mode and a loss mode.

In one embodiment, in the loss mode of the mobile terminal 100, since the mobile terminal 100 is lost, use of the mobile terminal 100 may be restricted.

In one embodiment, the artificial intelligence unit 130 may maintain the lock state of the mobile terminal 100 in the loss mode of the mobile terminal 100. The lock state of the mobile terminal 100 means a state for restricting use of the mobile terminal 100 and the artificial intelligence unit 130 may maintain display of the lock screen of the mobile terminal 100.

That is, the artificial intelligence unit 130 may maintain display of the lock screen, even if a touch pattern, fingerprint or password input for releasing the lock state matches a pre-stored touch pattern, fingerprint or password.

In another embodiment, the loss mode of the mobile terminal 100 may refer to a mode for blocking a specific function of the mobile terminal 100. The specific function may include one or more of a function for blocking use of data necessary to access a server through an application, a function for blocking a voice call and a function for blocking a video call.

Therefore, use of the mobile phone by another person which may incur expenses may be restricted if the mobile terminal 100 is lost.

In another embodiment, the artificial intelligence unit 130 may change the power supply state of the mobile terminal 100 in the loss mode of the mobile terminal 100. For example, the artificial intelligence unit 130 turns the mobile terminal 100 off in the loss mode of the mobile terminal 100.

As another example, the artificial intelligence unit 130 may change the power supply state of the mobile terminal 100 to a power saving state in which the mobile terminal 100 uses minimum power, in the loss mode of the mobile terminal 100.

The power saving state of the mobile terminal 100 may indicate that power for executing a currently executed application is applied or the brightness of the screen of the display unit 151 is minimally maintained.

In another embodiment, the artificial intelligence unit 130 may transmit a notice including the loss state of the mobile terminal 100 and the current position of the mobile terminal 100 to the pre-registered mobile terminal of another person, if the mobile terminal 100 enters the loss mode.

In another embodiment, the artificial intelligence unit 130 may activate the first camera 121a if power-off of the mobile terminal 100 is sensed through a power button in the loss mode of the mobile terminal 100. The artificial intelligence unit 130 may capture the image of another person who finds the mobile terminal 100 through the first camera 121a and transmit the captured image of another user to the mobile terminal of a protector of the user who lost the mobile terminal 500 or the artificial intelligence device 500.

The normal mode of the mobile terminal 100 may refer to an operation mode other than the loss mode of the mobile terminal 100.

The artificial intelligence unit 130 may directly change the operation mode of the mobile terminal 100 or instruct the controller 180 to change the operation mode of the mobile terminal 100, upon determining that the mobile terminal 100 is lost.

For example, the artificial intelligence unit 130 may generate a control signal for switching the operation mode of the mobile terminal 100 to the loss mode, upon determining that the mobile terminal 100 is lost. The artificial intelligence unit 130 may transmit the generated control signal to the controller 180. The controller 180 may switch the operation mode of the mobile terminal 100 from the normal mode to the loss mode according to the control signal received from the artificial intelligence unit 130.

As another example, the artificial intelligence unit 130 may autonomously switch the operation mode of the mobile terminal 100 from the normal mode to the loss mode, upon determining that the mobile terminal 100 is lost.

Meanwhile, the artificial intelligence unit 130 maintains the operation mode of the mobile terminal 100 in the normal mode, upon determining that the mobile terminal 100 is not lost (S507).

Hereinafter, the embodiment of FIG. 5 will be described in detail.

Figure 6:
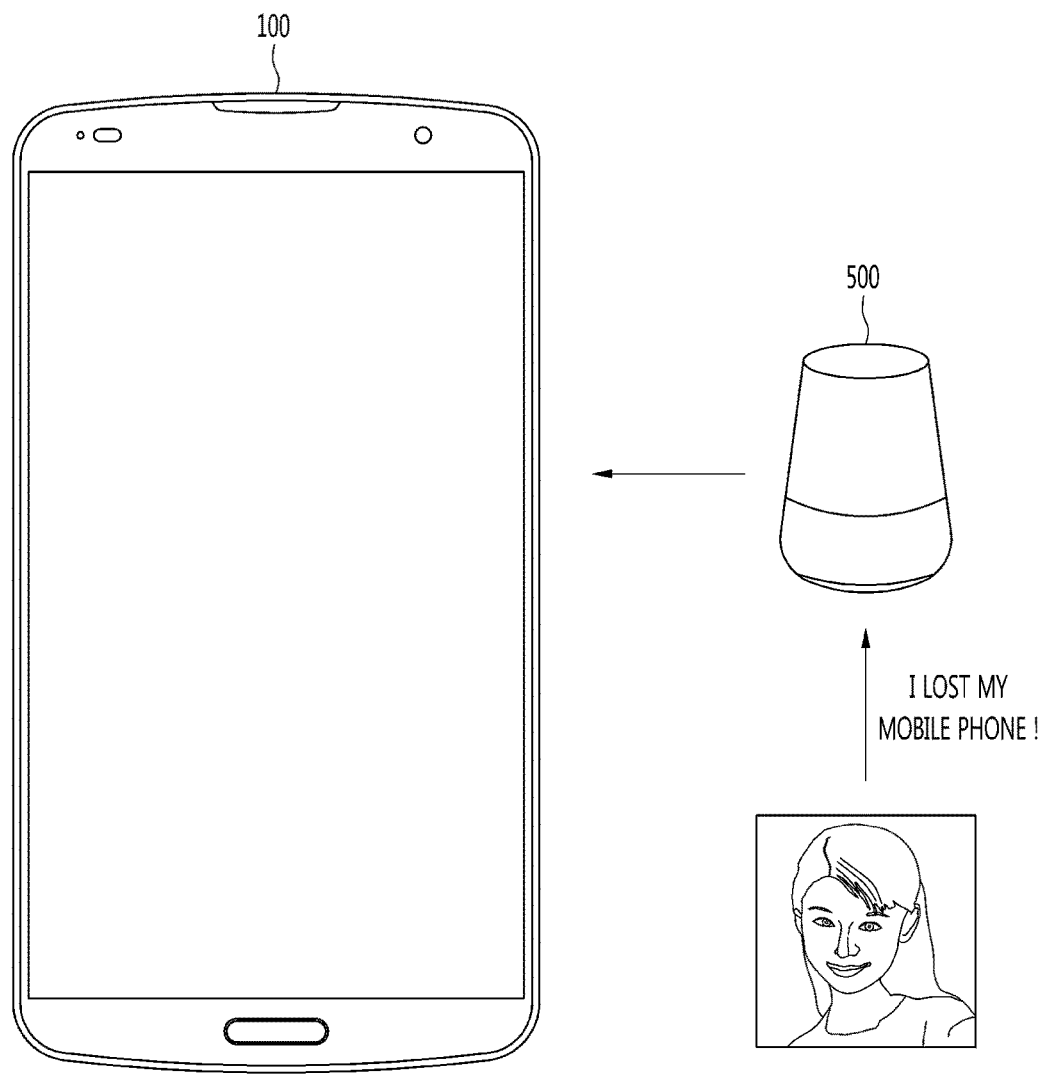
FIGS. 6 and 7 are diagrams illustrating a method of recognizing loss of a mobile terminal based on information received from an artificial intelligence device capable of performing communication with a mobile terminal according to an embodiment of the present invention.
Figure 7:
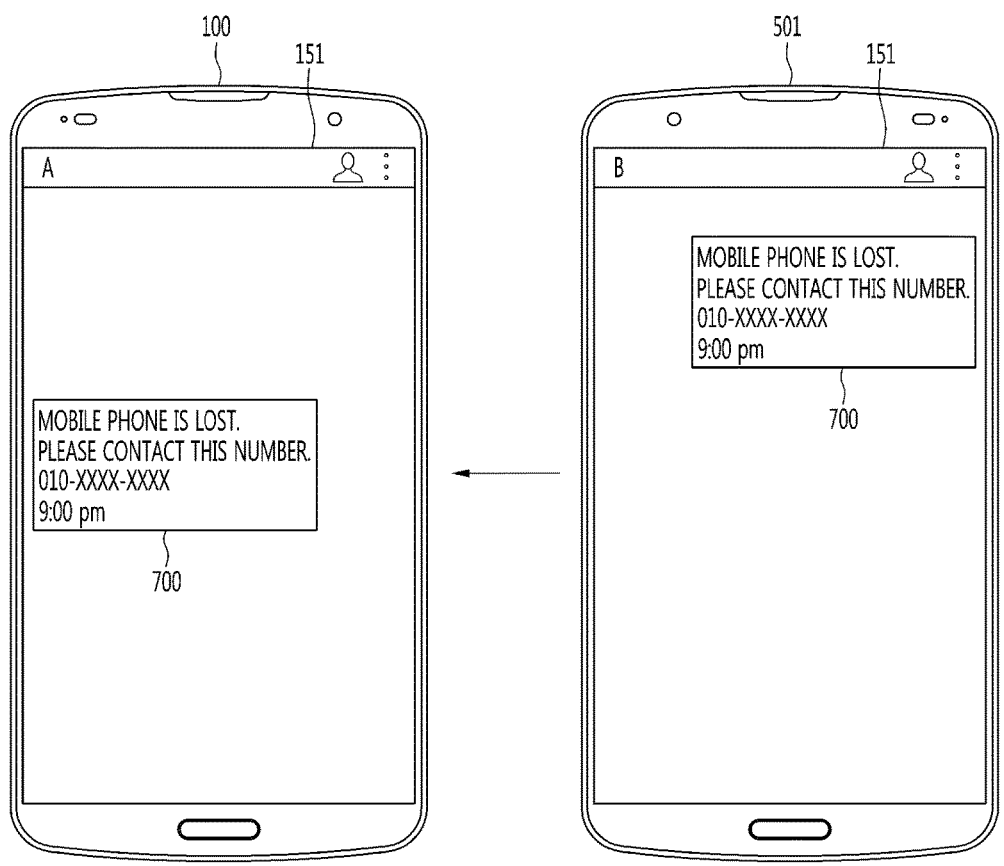

FIGS. 6 and 7 are diagrams illustrating a method of recognizing the loss state of a mobile terminal based on information received from the artificial intelligence device capable of performing communication with the mobile terminal according to an embodiment of the present invention.

Referring to FIG. 6, the artificial intelligence device 500 may receive voice from the user of the mobile terminal 100.

The artificial intelligence device 500 may transmit the received voice to the mobile terminal 100.

In one embodiment, the artificial intelligence device 500 may transmit the received voice to the mobile terminal 100, if the received voice includes a command for transmission to the mobile terminal 100. For example, if the received voice includes "I lost my mobile phone. Please transmit this information to my mobile phone", since the command "Please transmit this information to my mobile phone" is included, the artificial intelligence device 500 may transmit the voice to the mobile terminal 100.

In another embodiment, the artificial intelligence device 500 may transmit automatically received voice to the mobile terminal 100 if the received voice includes text related to the loss state of the mobile terminal 100. For example, if the received voice includes "I lost my mobile phone", the artificial intelligence device 500 may recognize information related to the loss state of the mobile terminal 100 from the text "mobile phone" and "lost" included in the received voice and transmit user voice to the mobile terminal 100.

The artificial intelligence unit 130 of the mobile terminal 100 may recognize the loss state of the mobile terminal 100 based on the context information of the mobile terminal 100 received from the artificial intelligence device 500.

For example, if the context information of the mobile terminal 100 received from the artificial intelligence device 500 includes voice, the artificial intelligence unit 130 may analyze one or more of the waveform and tone of the voice to determine whether the voice is the voice of the user of the mobile terminal.

The artificial intelligence unit 130 may extract features from the waveform of the voice. The features may be reference points used to distinguish the voice of the user of the mobile terminal 100 from voices of the other users.

The artificial intelligence unit 130 may determine that the received voice is the voice of the user of the mobile terminal 100, if the features extracted from the received voice match a plurality of pre-stored features by a predetermined ratio.

The artificial intelligence unit 130 may recognize the loss state of the mobile terminal 100, if the voice is pre-registered and the voice includes the loss state of the mobile terminal 100.

The artificial intelligence unit 130 may automatically switch the operation mode of the mobile terminal 100 from the normal mode to the loss mode, upon recognizing that the mobile terminal 100 is lost.

Next, FIG. 7 will be described.

By referring to FIG. 7, the mobile terminal 100 may receive a text message 700 from another mobile terminal 501.

The artificial intelligence unit 130 of the mobile terminal 100 may recognize that the mobile terminal 100 is lost, if the destination of the text message 700 is a pre-registered person and the text message 700 indicates the loss state of the mobile terminal.

The artificial intelligence unit 130 may recognize that the mobile terminal 100 is lost, if the text message 700 is received from a pre-registered person B and the sentence included in the text message 700 includes information indicating the loss state of the mobile terminal 100.

The artificial intelligence unit 130 may extract a keyword included in the text message 700 to recognize the loss state of the mobile terminal 100.

For example, the artificial intelligence unit 130 may extract keywords "mobile phone" and "loss" included in the text message 700 and recognize the loss state of the mobile terminal 100.

The artificial intelligence unit 130 may set the operation mode of the mobile terminal 100 to the loss mode, upon recognizing the loss state of the mobile terminal 100.

Next, a process of automatically recognizing and coping with the non-possession or loss state of the mobile terminal 100 will be described.

Figure 8:
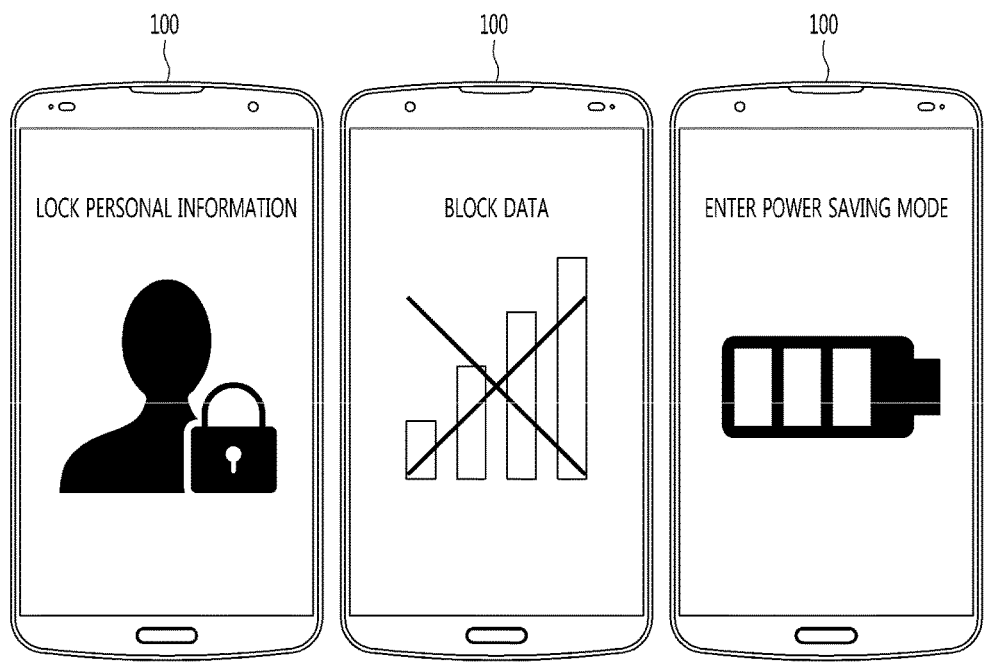
FIGS. 8 and 9 are diagrams illustrating operation performed in a loss mode of a mobile terminal according to an embodiment of the present invention.
Figure 9:
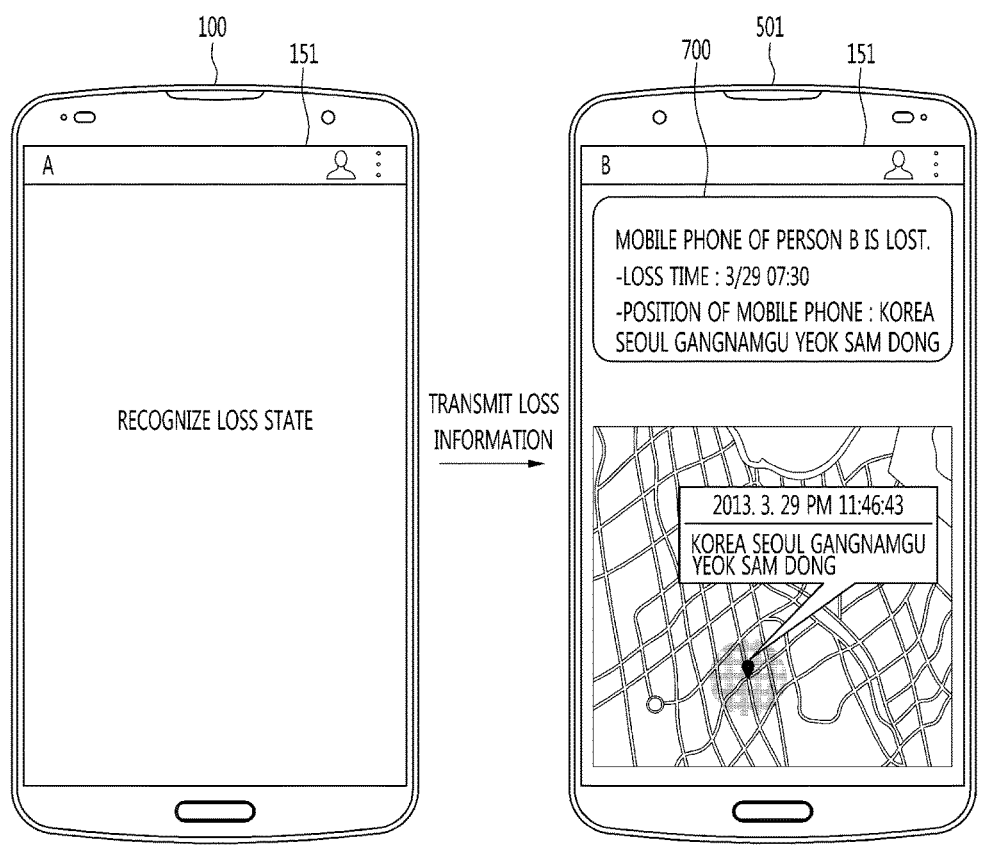

FIGS. 8 and 9 are diagrams illustrating operation performed in a loss mode of a mobile terminal according to an embodiment of the present invention.

First, FIG. 8 will be described.

The artificial intelligence unit 130 may switch the operation mode of the mobile terminal 100 to the loss mode, upon determining that the mobile terminal 100 is lost.

The artificial intelligence unit 130 may lock personal information to prevent the other persons from using the personal information stored in the mobile terminal 100 in the loss mode of the mobile terminal 100.

For example, the artificial intelligence unit 130 may set a contact application including contact information to lock state. That is, the artificial intelligence unit 130 may make a request for inputting a password for execution of the contact application, if a request for executing the contact application is received. Although the contact application is described herein, the present invention is not limited thereto and is similarly applicable to an application including personal information such as a social networking service application, a messaging application, or a gallery application for providing a video/image.

As another example, the artificial intelligence unit 130 may automatically set a lock function of an initial screen if a lock function is not set on the initial screen for accessing the home screen of the mobile terminal 100. The artificial intelligence unit 130 may change the mobile terminal 100 to the lock state using one of a touch pattern and password for unlocking, which has been used by the user.

As another example, the artificial intelligence unit 130 may block use of data for accessing an external server in the loss mode of the mobile terminal 100.

As another example, the artificial intelligence unit 130 may change the power mode of the mobile terminal 100 to the power saving mode in the loss mode of the mobile terminal 100.

To this end, in the loss mode of the mobile terminal 100, personal information can be prevented from being leaked, expenses incurred due to data use can be reduced, and the power of the mobile terminal can be maintained for a long time in order to find the mobile terminal 100.

Next, FIG. 9 will be described.

Referring to FIG. 9, the artificial intelligence unit 130 may transmit loss information indicating the loss state of the mobile terminal 100 to another mobile terminal 501 in the loss mode of the mobile terminal 100.

The other mobile terminal 501 may be the mobile terminal of the family member of the user included in the contact information stored in the mobile terminal 100.

The other mobile terminal 501 may display the loss information received from the mobile terminal 100.

The loss information may include text indicating the loss state of the mobile terminal 100, a point of time when the mobile terminal 100 is lost, and the position information of the mobile terminal 100.

The position information of the mobile terminal 100 may include the address and map of a place where the mobile terminal 100 is located at the point of time when the mobile terminal 100 is lost.

The artificial intelligence unit 130 may collect a point of time when the loss state of the mobile terminal 100 is sensed and the loss information of the position of the mobile terminal 100 at a point of time when the loss state of the mobile terminal is sensed.

The artificial intelligence unit 130 may control the wireless communication unit 110 to transmit the collected loss information to the other mobile terminal 501. The other mobile terminal 501 may be the mobile terminal of another person who most frequently contacts the user of the mobile terminal 100 within a week.

Thus, the person close to the user who has lost the mobile terminal 100 may rapidly recognize and cope with the loss state of the mobile terminal 100.

Next, an example in which the mobile terminal 100 autonomously senses loss thereof will be described.

Figure 10:
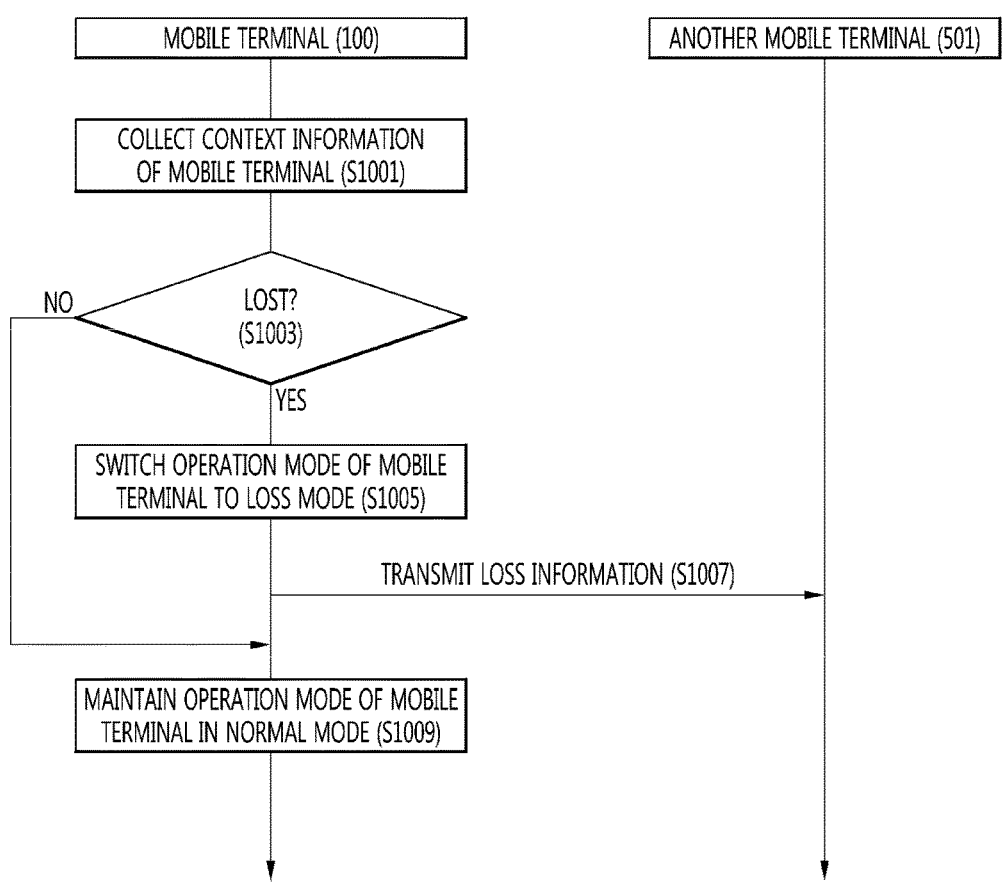
FIG. 10 is a ladder diagram illustrating a method of operating an artificial intelligence system according to another embodiment of the present invention.

FIG. 10 is a ladder diagram illustrating a method of operating an artificial intelligence system according to another embodiment of the present invention.

In FIG. 10, portions equal to those of FIG. 5 will be omitted.

The artificial intelligence unit 130 of the mobile terminal 100 collects the context information of the mobile terminal 100 (S1001).

The artificial intelligence unit 130 determines whether the mobile terminal 100 is lost based on the collected context information (S1003).

In one embodiment, the context information of the mobile terminal 100 may include one or more of the position pattern and user information of the mobile terminal 100.

The memory 170 may pre-store the position pattern of the mobile terminal 100.

The artificial intelligence unit 130 may collect places where the mobile terminal 100 is located during a predetermined period. The predetermined period may be a week, but this is merely an example.

The artificial intelligence unit 130 may collect the positions of the mobile terminal 100 acquired by the position information module 115 during the predetermined period and generate the position pattern using the collected positions.

The position pattern may indicate the movement path of the mobile terminal 100 obtained by connecting the collected positions by lines.

The user information of the mobile terminal 100 may include one or more of the facial image and voice of the user.

The artificial intelligence unit 130 may periodically activate the first camera 121a and capture the image of the front side of the mobile terminal 100.

The artificial intelligence unit 130 may check whether the face of the user who is the owner of the mobile terminal 100 is included in the images captured for the predetermine period.

The artificial intelligence unit 130 may periodically collect voice input through the microphone 122.

The artificial intelligence unit 130 may store the tone and voice pattern of the user who is the owner of the mobile terminal 100.

The artificial intelligence unit 130 may determine whether the voice of the user of the mobile terminal 100 is not present in the collected voce for the predetermined period.

The artificial intelligence unit 130 may determine that the mobile terminal 100 is lost, if the position pattern of the mobile terminal 100 is different from a pre-stored position pattern and the facial image or voice of the user is not acquired for a predetermined time.

The artificial intelligence unit 130 switches the operation mode of the mobile terminal 100 to the loss mode, upon determining that the mobile terminal 100 is lost (S1005).

The artificial intelligence unit 130 transmits loss information indicating the loss state of the mobile terminal 100 to another mobile terminal 501 (S1007).

In one embodiment, the loss information may include a point of time when loss of the mobile terminal 100 is sensed (or a point of time when the mobile terminal is lost) and the position of the mobile terminal 100 at the point of time when the mobile terminal 100 is lost.

The user of the other mobile terminal 501 may be an acquaintance pre-registered by the user of the mobile terminal 100 or a family member or friend of the user of the mobile terminal 100, which is autonomously set by the artificial intelligence unit 130 using contact information.

Meanwhile, the artificial intelligence unit 130 may maintain the operation of the mobile terminal 100 in the normal mode, upon determining that the mobile terminal is not lost (S1009).

Figure 11:
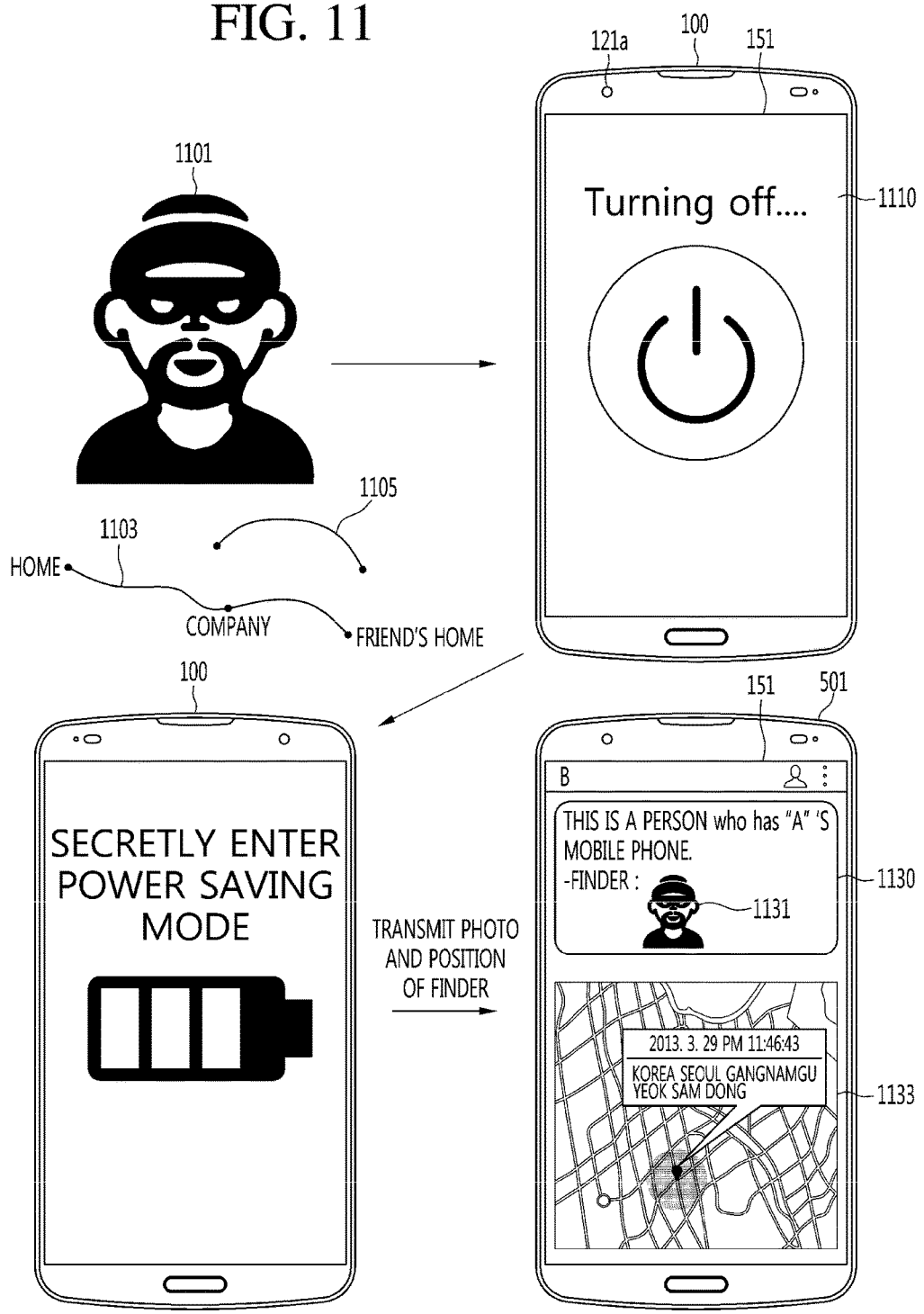
FIG. 11 is a diagram illustrating a process of sensing the loss state of a mobile terminal and transmitting information on loss of the mobile terminal to another mobile terminal.

FIG. 11 is a diagram illustrating a process of sensing the loss state of a mobile terminal and transmitting loss information of the mobile terminal to another mobile terminal.

Referring to FIG. 11a, the artificial intelligence unit 130 may compare the pre-stored position pattern 1103 of the mobile terminal 100 with a current position pattern 1105.

In addition, the artificial intelligence unit 130 may periodically collect images captured through the first camera 121a. The artificial intelligence unit 130 may determine whether the face of the user is included in the images collected during the predetermined period.

The artificial intelligence unit 130 may determine that the mobile terminal 100 is lost if the current position pattern 1105 of the mobile terminal 100 does not match the pre-stored position pattern and the face of the user is not included in the images collected during the predetermined period.

The artificial intelligence unit 130 may determine that the mobile terminal 100 is lost, if the current position pattern 1105 of the mobile terminal 100 does not match the pre-stored position pattern by a predetermined ratio and the face of the user is not included in the images collected during the predetermined period.

The artificial intelligence unit 130 may switch the operation of the mobile terminal 100 to the loss mode.

The artificial intelligence unit 130 may display a power off screen 1110 for turning the mobile terminal 100 off, if a command for turning the mobile terminal 100 off is received in the loss mode of the mobile terminal 100.

The artificial intelligence unit 130 may not turn the mobile terminal 100 off while displaying the power off screen 1110, in order to track the finder 1101 of the mobile terminal 100.

The artificial intelligence unit 130 may change the power mode of the mobile terminal 100 to the power saving mode while displaying the power off screen 1110.

Thereafter, the artificial intelligence unit 130 may acquire the photo of the finder 1101 captured through the first camera 121a if the mobile terminal 100 is lost.

The artificial intelligence unit 130 may transmit loss information 1130 including the photo 1131 of the finder 1101, the point of time when the mobile terminal 100 is lost, and the position information 1133 of the mobile terminal to the other mobile terminal 501.

The other mobile terminal 501 may display the loss information 1130 received from the mobile terminal 100 through the display unit 151.

To this end, the owner of the mobile terminal 100 may rapidly check the loss state of the mobile terminal 100 using the loss information received by the other mobile terminal 501.

Next, operation performed if the user of the mobile terminal 100 recognizes non-possession of the mobile terminal 100 will be described.

Figure 12A:
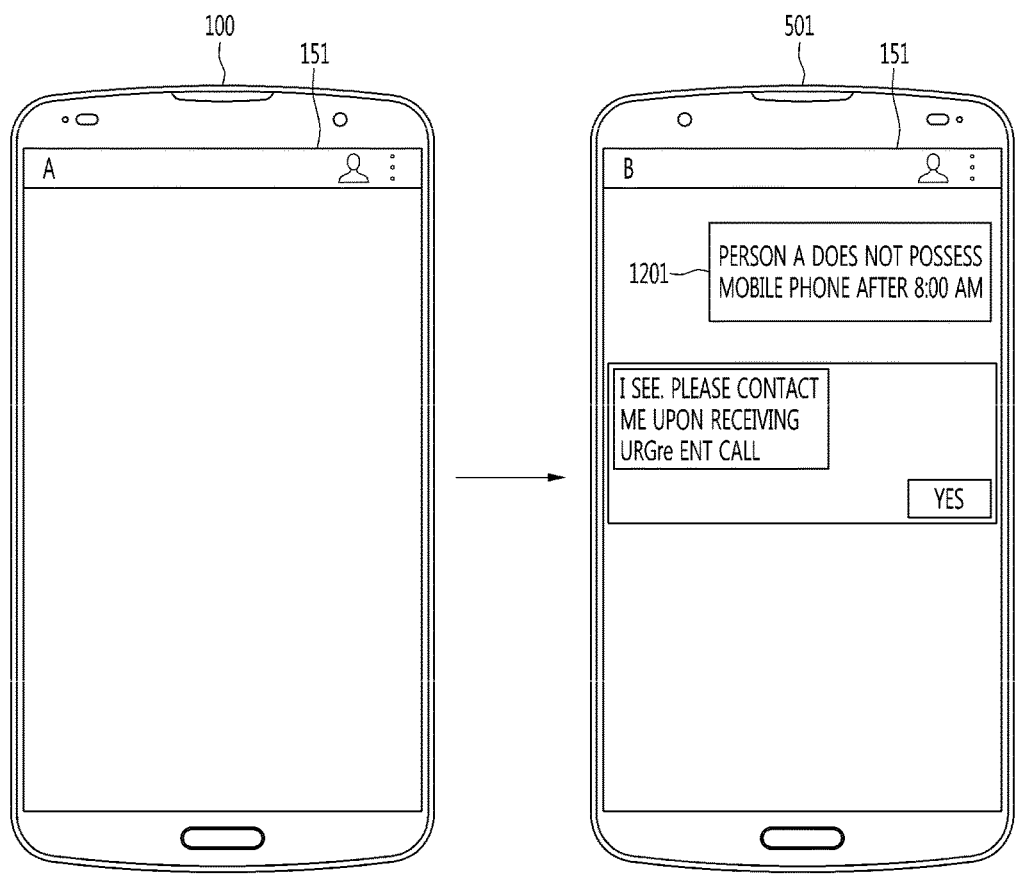
FIGS. 12a to 12c are diagrams illustrating an example of recognizing non-possession of a mobile terminal and automatically transmitting a notice to another mobile terminal according to an embodiment of the present invention.
Figure 12B:
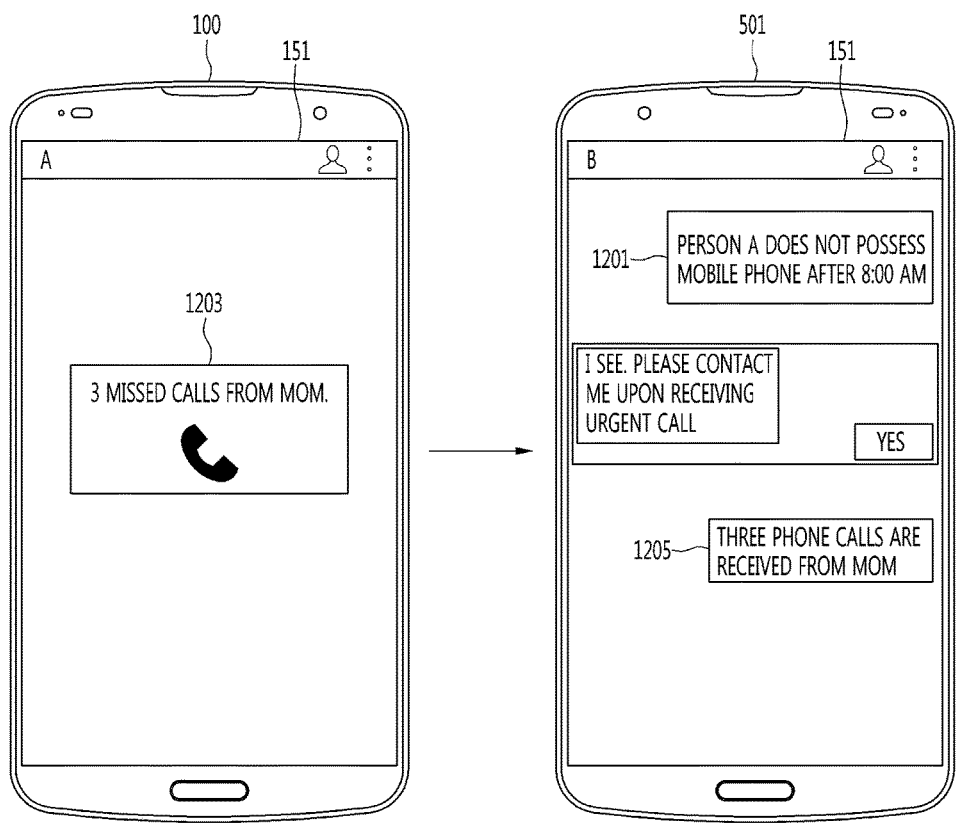
Figure 12C:
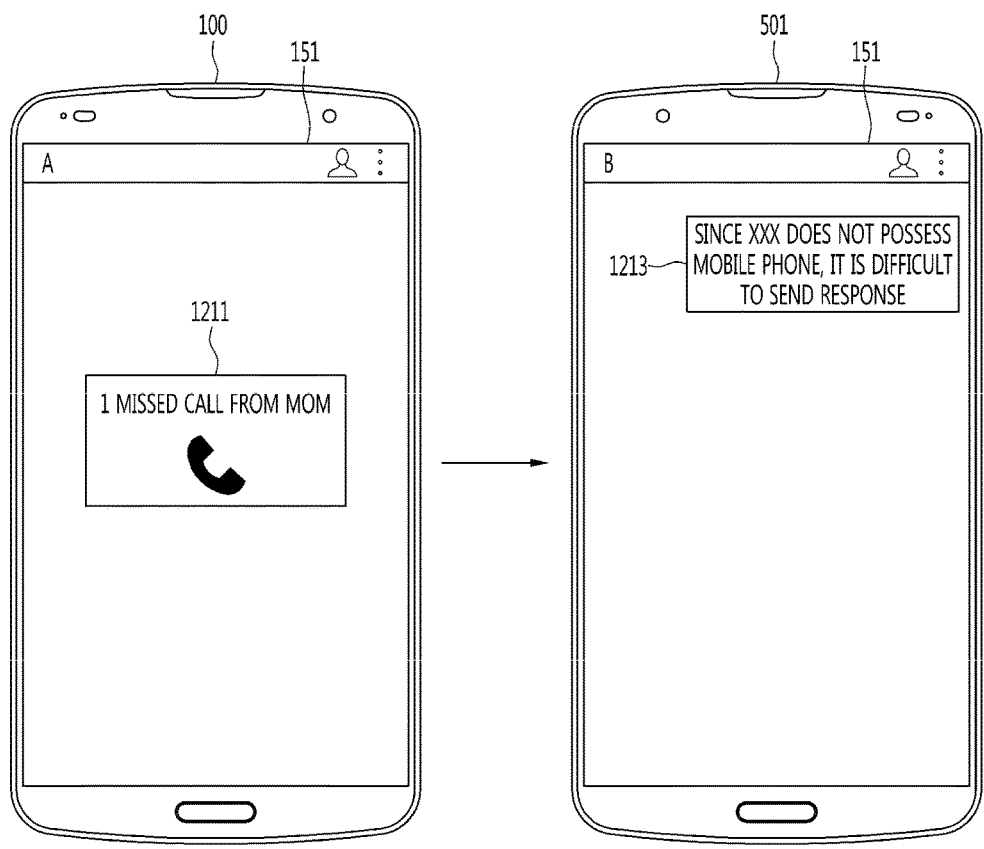

FIGS. 12*a* to 12*c* are diagrams illustrating an example of recognizing non-possession of a mobile terminal and automatically transmitting a notice to another mobile terminal according to an embodiment of the present invention.

The artificial intelligence unit 130 may compare the pre-stored use pattern of the mobile terminal 100 with a current use pattern.

The artificial intelligence unit 130 may determine that the user does not possess the mobile terminal 100, if the pre-stored use pattern of the mobile terminal 100 does not match the current use pattern.

The pre-stored use pattern may include one or more of whether the display unit 151 is turned on or off and execution of an application installed in the mobile terminal 100.

The artificial intelligence unit 130 may determine that the user does not possess the mobile terminal 100, if a command for turning the display unit 151 on or off is not received for a predetermined period.

The artificial intelligence unit 130 may determine that the user does not possess the mobile terminal 100, if a command for executing the application is not received for a predetermined period.

The artificial intelligence unit 130 may determine that the user does not possess the mobile terminal 100, if the position of the mobile terminal 100 is fixed for a predetermined period.

The artificial intelligence unit 130 may transmit information 1201 indicating that the user of the mobile terminal 100 does not possess the mobile terminal 100 to the other mobile terminal 100 of another person, as shown in FIG. 12*a*, if the user does not possess the mobile terminal 100.

Here, another person may be a person who most frequently contacts the user of the mobile terminal 100 during a predetermined period, which is merely exemplary.

As shown in FIG. 12*b*, the artificial intelligence unit 130 may display missed call information 1203, if an incoming call signal is received from another person in a state in which the user does not possess the mobile terminal 100. Simultaneously, the artificial intelligence unit 130 may additionally transmit the missed call information 1203 to the other mobile terminal 501.

Therefore, the other mobile terminal 501 may display missed call notification information 1205 based on the received missed call information 1203.

As shown in FIG. 12*c*, the artificial intelligence unit 130 may display missed call information 1211, if an incoming call signal is received from the mobile terminal 501 of another person in a state in which the user does not possess the mobile terminal 100.

The artificial intelligence unit 130 may transmit non-possession information 1213 indicating that the user does not possess the mobile terminal 100 to the mobile terminal 501 of another person.

Therefore, the counterpart may recognize that the owner of the mobile terminal 100 does not possess the mobile terminal 100.

Figure 13:
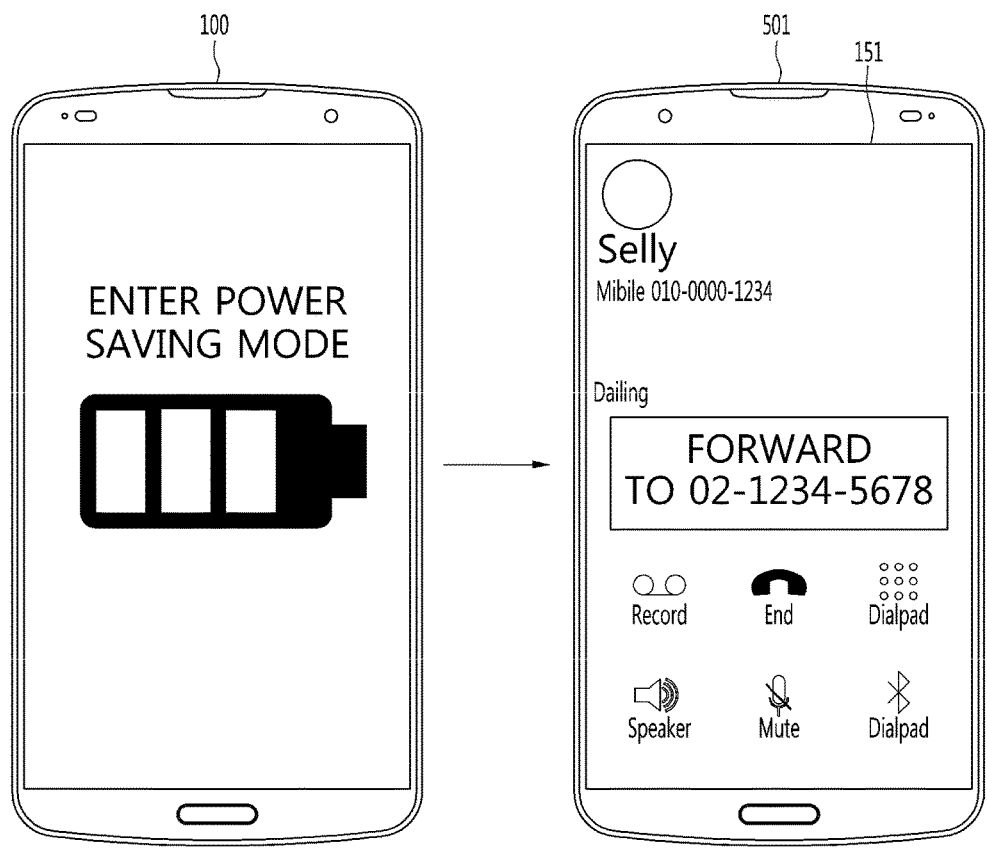
FIG. 13 is a diagram illustrating a process of performing automatic call forwarding to another phone number if an incoming call signal is received in a state in which a user does not possess a mobile terminal according to an embodiment of the present invention.

FIG. 13 is a diagram illustrating a process of performing automatic call forwarding to another phone number if an incoming call signal is received in a state in which a user does not possess a mobile terminal according to an embodiment of the present invention.

The artificial intelligence unit 130 may switch the power mode of the mobile terminal 100 to the power saving mode, upon sensing that the user does not possess the mobile terminal 100. Therefore, it is possible to prevent unnecessary power waste if the user does not possess the mobile terminal 100.

The artificial intelligence unit 130 may perform call forwarding to a pre-registered phone number if an incoming call signal is received in a state in which the user does not possess the mobile terminal.

Here, the pre-registered phone number is a phone number of a company of the user of the mobile terminal 100, which is merely exemplary.

Therefore, the user may contact a caller even if the user does not possess the mobile terminal 100.

Figure 14:
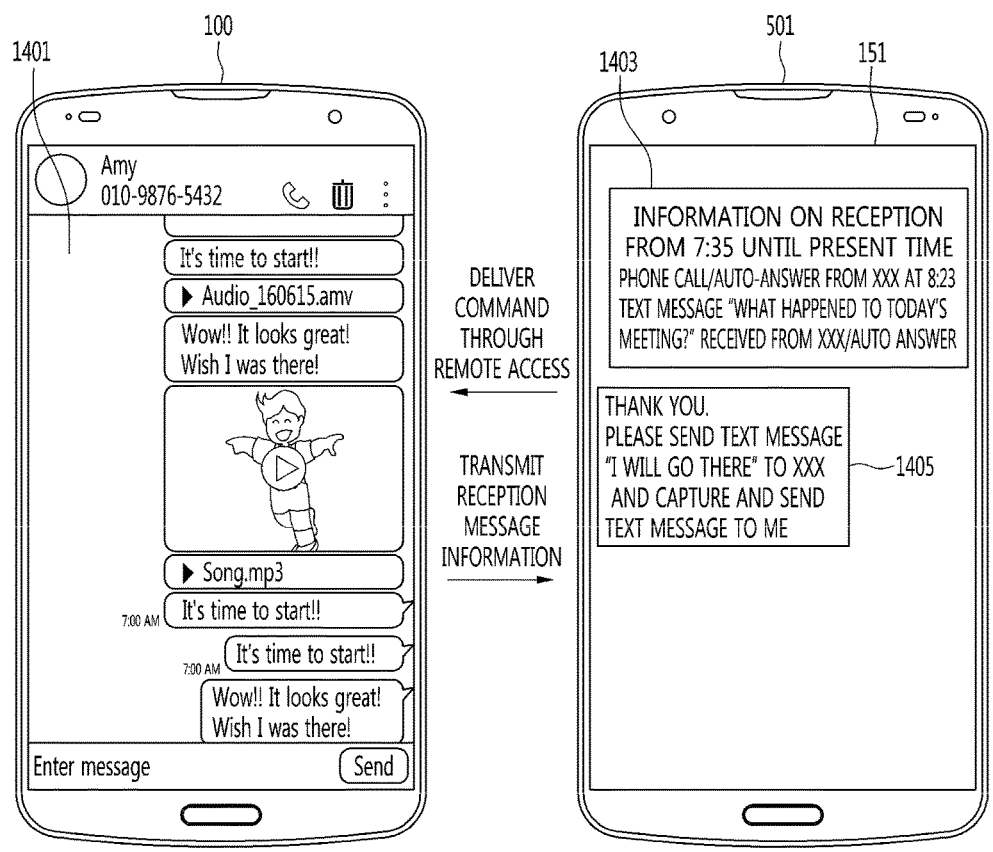
FIG. 14 is a diagram illustrating a process of remotely controlling a mobile terminal in a state in which a user does not possess the mobile terminal according to an embodiment of the present invention.

FIG. 14 is a diagram illustrating a process of remotely controlling a mobile terminal in a state in which a user does not possess the mobile terminal according to an embodiment of the present invention.

Referring to FIG. 14, the artificial intelligence unit 130 may receive a remote control command from the other mobile terminal 501. The remote control command may be a command for enabling the other mobile terminal 501 to remotely control operation of the mobile terminal 100.

Referring to FIG. 14, the artificial intelligence unit 130 of the unpossessed mobile terminal 100 may receive the remote control command from the other mobile terminal 501.

The artificial intelligence unit 130 may determine whether the identification information of the other mobile terminal 501 included in the remote control command is pre-registered identification information.

The artificial intelligence unit 130 may accept remote control if the identification information of the other mobile terminal 501 included in the remote control command is the pre-registered identification information, in order to prevent the non-registered mobile terminal of another person from remotely controlling the mobile terminal 100 of the user.

The artificial intelligence unit 130 may extract message summary information from a message window 1401 received by the mobile terminal 100, if the remote control command requests the message summary information of the message received by the mobile terminal 100.

The artificial intelligence unit 130 may acquire, from the message window 1401, messages received from a counterpart and extract only the questions of the counterpart.

The artificial intelligence unit 130 may transmit the message summary information including the questions of the counterpart to the other mobile terminal 501.

The other mobile terminal 501 may display the received message summary information 1403.

The other mobile terminal 501 may receive the voice response of the user, convert the voice response into text and transmit the converted text response 1405 to the mobile terminal 100.

Therefore, the user may remotely control the mobile terminal 100 even in a state in which the user does not possess the mobile terminal 100 and thus conveniently respond to the message received by the mobile terminal 100.

Although operation performed in a state in which the mobile terminal 100 is not possessed is described, the present invention is not limited thereto and is applicable to operation performed even if the mobile terminal 100 is lost.

That is, the artificial intelligence unit 130 may automatically transmit a notice to the pre-registered mobile terminal 501 in the loss mode of the mobile terminal 100, as shown in FIGS. 12*a* to 12*c*.

In addition, the artificial intelligence unit 130 may perform call forwarding to the pre-registered phone number if an incoming call signal is received in the loss mode of the mobile terminal 100, as shown in FIG. 13.

According to the embodiments of the present invention, even if the mobile terminal is lost, use of the mobile terminal by a finder is restricted, such that data charges caused by indiscriminate use of the mobile terminal or leakage of personal information may be prevented.

According to the embodiments of the present invention, since the mobile terminal autonomously senses the loss state thereof and changes the operation mode thereof to a loss mode, use of the mobile terminal by the finder may be automatically restricted without action of the user.

According to the embodiment of the present invention, the mobile terminal, which has sensed the loss state, may transmit loss information to another terminal, thereby easily finding the mobile terminal.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claims is:

1. A mobile terminal comprising:
a display;
a camera;
a wireless communication unit configured to perform wireless communication with an external device and comprising a position information module configured to acquire a position of the mobile terminal; and
a controller configured to:
receive a signal from the external device via the wireless communication unit;
recognize a loss state of the mobile terminal based on recognized content of the received signal;
generate a control signal for switching an operation mode of the mobile terminal according to the recognized loss state;
set the operation mode of the mobile terminal to a loss state mode for restricting use of the mobile terminal according to the generated control signal;
cause the display to display a power off screen indicating that the mobile terminal is being turned off according to a command to turn off the mobile terminal while the mobile terminal is in the loss state mode;
change a power mode of the mobile terminal to a power saving mode after displaying the power off screen;
according to the command and after displaying the power off screen, capture an image of a finder of the mobile terminal while the mobile terminal is in the loss state mode;
transmit the captured image of the finder and position information of the mobile terminal to the external device;
receive, from the external device, a remote control command for enabling the external device to remotely control operation of the mobile terminal, wherein the remote control command comprises a request for incoming messages received from another terminal;
authenticate identification information of the external device included in the remote control command based on pre-registered identification information;
when authentication is successful and in response to the remote control command, extract question messages which include questions from the incoming messages received from the another terminal and transmit the extracted question messages to the external device while the mobile terminal is in the loss state mode;
receive one or more response messages from the external device responding to the extracted question messages; and
transmit the one or more response messages to the another terminal.

2. The mobile terminal according to claim 1, wherein the received signal comprises a text message and the recognized content corresponds to text indicating the loss state.

3. The mobile terminal according to claim 1, wherein the received signal comprises voice information and the recognized content corresponds to recognized speech information indicating the loss state.

4. The mobile terminal according to claim 3, wherein the controller is further configured to recognize a voice of the voice information based on pre-stored voice data and the recognized content further comprises recognizing the voice of the voice information.

5. The mobile terminal according to claim 1, wherein the loss state mode corresponds to setting the mobile terminal to a locked state, restricting data communication of the mobile terminal, or setting the mobile terminal to a power saving mode.

6. The mobile terminal according to claim 1, wherein the controller is further configured to transmit time information to the external device corresponding to when the loss state is determined.

7. The mobile terminal according to claim 6, wherein the controller is further configured to transmit the time information to the external device associated with a person that is most frequently in communication with the mobile terminal.

8. The mobile terminal according to claim 1, wherein the controller is further configured to forward an incoming call to the external device while the mobile terminal is in the loss state mode.

9. The mobile terminal according to claim 8, wherein:
the received signal comprises a message and the loss state is determined based on an indication in the message indicating the loss state; and
the external device is designated by the message which comprises contact information of the external device.

10. A mobile terminal comprising:
a display;
a camera;
a wireless communication unit configured to perform wireless communication with an external device and comprising a position information module configured to acquire a position of the mobile terminal; and
a controller configured to:
collect context information of the mobile terminal,
recognize a loss state of the mobile terminal based on the collected context information; and
set the operation mode of the mobile terminal to a loss state mode for restricting use of the mobile terminal according to the collected context information;
cause the display to display a power off screen indicating that the mobile terminal is being turned off according to a command to turn off the mobile terminal while the mobile terminal is in the loss state mode;
change a power mode of the mobile terminal to a power saving mode after displaying the power off screen;
according to the command and after displaying the power off screen, capture an image of a finder of the mobile terminal while the mobile terminal is in the loss state mode;
transmit the captured image of the finder and position information of the mobile terminal to the external device;
receive, from the external device, a remote control command for enabling the external device to remotely control operation of the mobile terminal, wherein the remote control command comprises a request for incoming messages received from another terminal;
authenticate identification information of the external device included in the remote control command based on pre-registered identification information;
when authentication is successful and in response to the remote control command, extract question messages which include questions from the incoming messages received from the another terminal and transmit the extracted question messages to the external device while the mobile terminal is in the loss state mode;
receive one or more response messages from the external device responding to the extracted question messages; and
transmit the one or more response messages to the another terminal.

11. The mobile terminal according to claim 10, wherein the context information comprises a location pattern of the mobile terminal in combination with user information of the mobile terminal.

12. The mobile terminal according to claim 11, wherein the controller is further configured to determine the loss state of the mobile terminal when the location pattern of the mobile terminal does not match a pre-stored location pattern and the user information comprising an image of a user's face and voice input of the user is not received for a predetermined time period.

13. The mobile terminal according to claim 12, wherein the controller is further configured to cause the display to turn off when the loss state mode is determined and set the mobile terminal to a power saving mode.

14. The mobile terminal according to claim 10, wherein the controller is further configured to forward an incoming call to another designated terminal while the mobile terminal is in the loss state mode.

15. The mobile terminal according to claim 14, wherein:
the collected context information comprises a received message and the loss state is determined based on an indication in the received message indicating the loss state; and
the another designated terminal is designated by the received message which comprises contact information of the another designated terminal.

* * * * *